US012606378B2

(12) United States Patent　　(10) Patent No.:　US 12,606,378 B2

Jeon　　　　　　　　　　　　　　(45) Date of Patent:　　Apr. 21, 2026

(54) PICKING SYSTEM INCLUDING SERVER FOR ASSIGNING TASK AND ROBOT FOR PERFORMING DELIVERY ACCORDING TO ASSIGNED TASK

(71) Applicant: TWINNY CO., LTD., Daejeon (KR)

(72) Inventor: Seol Hee Jeon, Daejeon (KR)

(73) Assignee: TWINNY CO., LTD., Daejeon (KR)

( * ) Notice: Subject to any disclaimer, the term of this patent is extended or adjusted under 35 U.S.C. 154(b) by 629 days.

(21) Appl. No.: 17/928,727

(22) PCT Filed: Nov. 24, 2022

(86) PCT No.: PCT/KR2022/018755

§ 371 (c)(1),
(2) Date: Nov. 30, 2022

(87) PCT Pub. No.: WO2024/096183

PCT Pub. Date: May 10, 2024

(65) Prior Publication Data

US 2024/0239607 A1　　Jul. 18, 2024

(30) Foreign Application Priority Data

Nov. 3, 2022　(KR) ........................ 10-2022-0145007

(51) Int. Cl.
　B65G 1/137　　　　(2006.01)
　B65G 1/04　　　　(2006.01)
　　　　　(Continued)

(52) U.S. Cl.
　CPC ......... B65G 1/1378 (2013.01); B65G 1/0492 (2013.01); B65G 1/1371 (2013.01);
　　　　　(Continued)

(58) Field of Classification Search
　CPC .. B65G 1/1373; B65G 1/1375; B65G 1/0492; B65G 1/1378; B65G 67/04; B65G 1/065;
　　　　　(Continued)

(56) References Cited

U.S. PATENT DOCUMENTS 6,208,908 B1 *　3/2001　Boyd ................... G06Q 10/087
　　　　　　　　　　　　　　　　　　198/704
2013/0317642 A1 *　11/2013　Asaria ................... G06Q 10/08
　　　　　　　　　　　　　　　　　　700/216
(Continued)

FOREIGN PATENT DOCUMENTS

JP　　2022-78741 A　　5/2022
KR　　10-1691329 B1　12/2016
　　　　　(Continued)

*Primary Examiner* — Timothy R Waggoner

(74) *Attorney, Agent, or Firm* — Goldilocks ZONE IP LAW

(57)　　　　　ABSTRACT

A task performance method of a system includes assigning, by the server, at least one task of a plurality of tasks stored in advance to a first robot among the plurality of robots, determining, by the server, a path for arranging the first robot to a first location in which at least one delivery object related to the task assigned to the first robot is stored, guiding, by the server, the first robot to the first location according to the determined path, and guiding, by the server, the first robot arranged in the first position to a second position.

12 Claims, 7 Drawing Sheets

(51) Int. Cl.

| | |
|---|---|
| *G05D 1/69* | (2024.01) |
| *G05D 101/00* | (2024.01) |
| *G05D 105/28* | (2024.01) |
| *G05D 107/70* | (2024.01) |

(52) U.S. Cl.
CPC ........... *G05D 1/69* (2024.01); *G05D 2101/22* (2024.01); *G05D 2105/285* (2024.01); *G05D 2107/70* (2024.01)

(58) Field of Classification Search
CPC .. B65G 2209/06; G06Q 10/087; G06Q 10/08; B25J 5/007; G05B 19/41895; G05B 2219/40298; G05D 1/69; G05D 2101/22; G05D 2105/285; G05D 2107/70
See application file for complete search history.

(56) References Cited

U.S. PATENT DOCUMENTS

| | | | |
|---|---|---|---|
| 2020/0122927 A1* | 4/2020 | Bellar .................. | G06Q 10/087 |
| 2020/0242544 A1* | 7/2020 | Galluzzo ............... | B25J 9/1692 |
| 2021/0304559 A1* | 9/2021 | Cupersmith ........... | G07F 17/42 |
| 2021/0354919 A1 | 11/2021 | Liu et al. | |
| 2022/0250844 A1* | 8/2022 | Kreis ................... | G05D 1/646 |

FOREIGN PATENT DOCUMENTS

| | | |
|---|---|---|
| KR | 10-2019-0107095 A | 9/2019 |
| KR | 10-2020-0047264 A | 5/2020 |
| KR | 10-2022-0029346 A | 3/2022 |
| KR | 10-2383648 B1 | 4/2022 |
| KR | 10-2425106 B1 | 7/2022 |

* cited by examiner

① Detect event related to location movement(S410)

② Move to another location(S420)

PICKING SYSTEM INCLUDING SERVER FOR ASSIGNING TASK AND ROBOT FOR PERFORMING DELIVERY ACCORDING TO ASSIGNED TASK

CROSS-REFERENCE TO RELATED APPLICATIONS

This application claims the benefit under 35 U.S.C. section 371, of PCT International Application No. PCT/KR2022/018755, filed on Nov. 24, 2022, which claims priority to Korean Patent Application No. 10-2022-0145007, filed on Nov. 3, 2022, in the Korean Intellectual Property Office, both of which are hereby incorporated by reference in their entireties.

TECHNICAL FIELD

The present disclosure relates to a picking system that can be utilized in a distribution center that handles many delivery objects, and more specifically, a server that assigns a task for releasing a delivery object stored in each region and a robot that is operated according to the assigned task.

BACKGROUND ART

In the case of a conventional distribution center, although delivery object information is shared electronically by using a barcode scan and a portable terminal, the labor force of a picking worker who picks up and moves a delivery object is still required.

In particular, orders are explosively increased during certain seasons such as brand events and holidays. In this case, working hours of picking workers are increased or short-term part-time jobs are additionally employed to process the quantity.

DISCLOSURE

Technical Problem

The present disclosure provides a server that manages schedules of a plurality of robots performing picking of delivery objects.

The present disclosure provides a robot that automatically moves to a region where a delivery object is stored after being assigned a task and transfers the delivery object to a packing region when the delivery object is loaded to reduce human labor in the distribution center.

The present disclosure provides a task performance method of a system including a robot and a server that detects occurrence of various events during task execution and moves to another location.

Objects of the present disclosure are not limited to the above-mentioned purposes, and other objects and advantages of the present disclosure that are not mentioned may be understood by the following description, and will be more clearly understood by examples of the present disclosure. Moreover, it will be readily apparent that the objects and advantages of the present disclosure may be realized by means and combinations thereof indicated in claims.

Technical Solution

According to one embodiment of the present disclosure, there is provided a task performance method of a system configured to perform a task on a delivery object using a plurality of robots assisting a worker, in which the task includes information on a location where one or more delivery objects are stored and the system includes a server and the plurality of robots. The task performance method includes assigning, by the server, at least one task of a plurality of tasks stored in advance to a first robot among the plurality of robots, determining, by the server, a path for arranging the first robot to a first location in which at least one delivery object related to the task assigned to the first robot is stored, guiding, by the server, the first robot to the first location according to the determined path, and guiding, by the server, the first robot arranged in the first position to a second position.

The task performance method may include displaying, by the first robot, information on a loading box of the first robot in which the delivery object related to the assigned task should be loaded through a display of the first robot.

The task performance may further include confirming, by the first robot, loading of the delivery object to the loading box of the first robot.

The task performance method may further include scanning, by the first robot, an identification mark attached to the delivery object through a scanner of the first robot.

The task performance method may further include assigning, by the server, a new task to the first robot when the scanning of the identification marks of all delivery objects included in the task is completed.

The task performance method may further include receiving, by the first robot, a user input selecting at least one of a location where a deliver object included in a new task is stored, a location of a station where the delivery object loaded in the first robot is unloaded, and a location of a station where the robot is charged as the second location, through a display of the first robot, and determining, by the server, a path for assigning the first robot to the second location.

The task performance method may further include guiding, by the server, the first robot to a packing station for packing the delivery object loaded on the first robot.

The task performance method may further include moving the first robot to a packing region matching classification criteria of the delivery object loaded on the first robot among a plurality of packing regions constituting the packing station.

The task performance method may further include displaying, by the server, monitoring information on the plurality of tasks through at least one display device. Here, the monitoring information may include at least one of the number of processed tasks, the number of unprocessed tasks, a location of a robot to which the task is assigned, a location of a robot to which the task is not assigned, and a loading progress rate of the delivery object included in the task assigned to the each robot.

The task performance may further include moving the first robot to the second location when weight of the delivery object loaded on the first robot exceeds a reference weight or a load equal to or larger than a reference value is applied to a predetermined area by the delivery object loaded on the first robot.

The guiding of the first robot to the second location may include guiding, by the server, the first robot to the second location corresponding to a standby location when a work end time has arrived.

The guiding the first robot to the second location may include guiding, by the server, the first robot to the second location corresponding to an evacuation location closest to a current position of the first robot when a preset emergency situation occurs.

Advantageous Effects

The server according to the present disclosure may assign a task by selecting an optimal robot according to the information on the task assigned to each robot and the location of each robot. In addition, the server according to the present disclosure contributes to the optimization of the robot movement by selecting an optimal location for the robot to move during task execution or after the task execution is completed.

The robot according to the present disclosure increases work efficiency of a worker, such as notifying a worker/manager of a location of at least one other robot that is nearby after loading in the parking region.

The robot according to the present disclosure automatically moves to a region where the delivery object matching the assigned task is stored, identifies whether to load, and sequentially performs a plurality of tasks to load and unload, whereby greatly contributing to the delivery process of the delivery object in a distribution center or the like.

MODE FOR INVENTION

Figure 1:
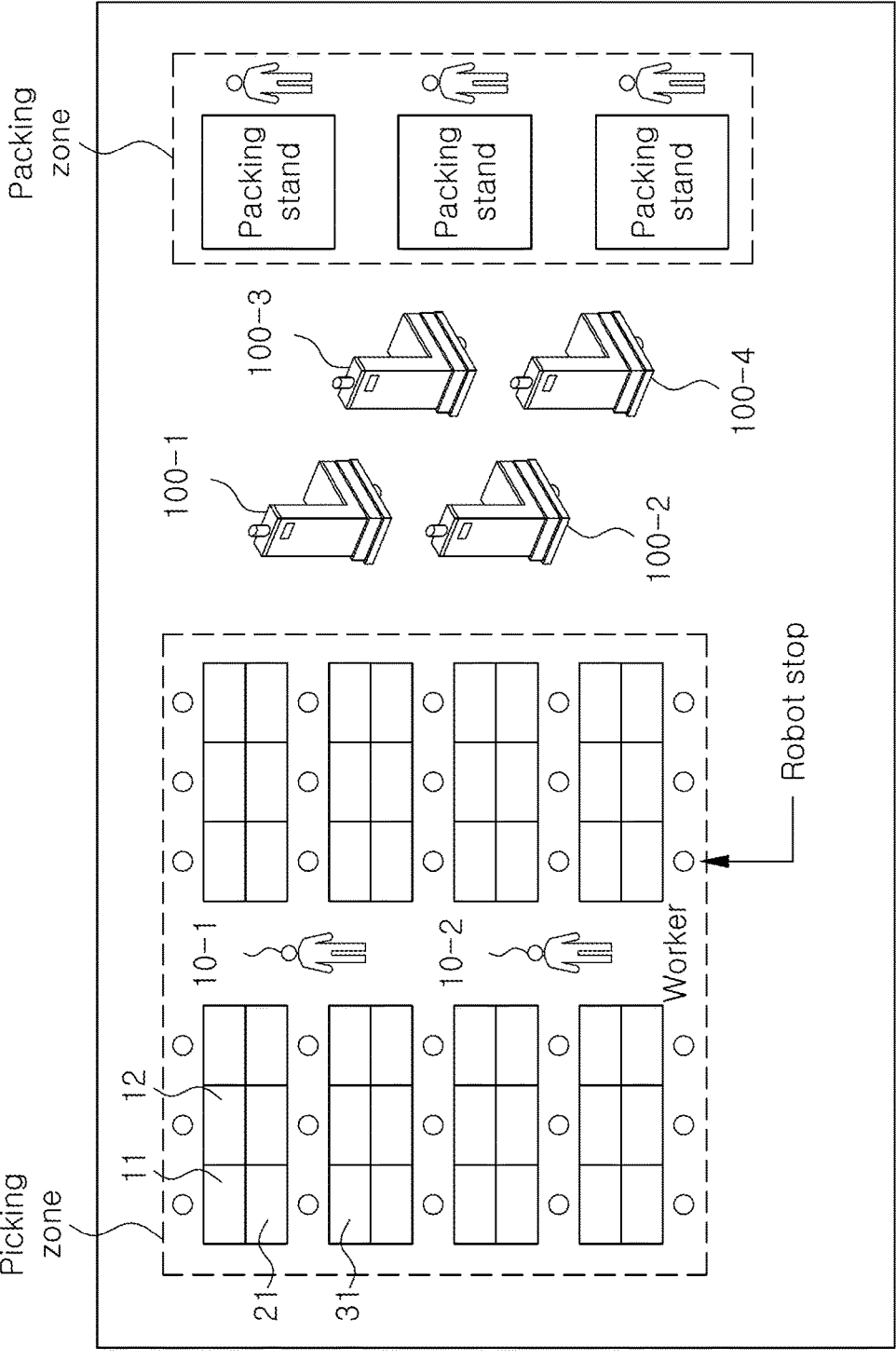
FIG. 1 is a diagram for explaining an operation in which a plurality of robots move to a packing zone by performing picking in each region within a picking zone according to one embodiment of the present disclosure.

Hereinafter, Prior to describing the present disclosure in detail, a description will be given of the description of the present specification and drawings.

First, terms used in the present specification and claims have been selected in consideration of functions in various embodiments of the present disclosure. However, these terms may vary depending on the intention or legal or technical interpretation of a person skilled in the art, and the emergence of new technology. Moreover, some terms are arbitrarily selected by the applicant. These terms may be interpreted in the meaning defined in the present specification, and when there is no specific term definition, it may be interpreted based on the general content of the present specification and common technical knowledge in the art.

In addition, the same reference numerals or reference numerals in each drawing attached to this specification indicate parts or components that perform substantially the same functions. For convenience of description and understanding, the same reference numerals or reference numerals are used in different embodiments. That is, even though all components having the same reference number are illustrated in a plurality of drawings, the plurality of drawings do not mean one embodiment.

In addition, in this specification and claims, terms including an ordinal number, such as "first" and "second", may be used to distinguish between elements. This ordinal number is used to distinguish the same or similar elements from each other, and the meaning of the term should not be construed as limited due to the use of the ordinal number. As an example, the components combined with such an ordinal number should not be limited in the order of use or the order of arrange by the number. If necessary, each ordinal number may be used interchangeably.

In this specification, the singular expression includes the plural expression unless the context clearly dictates otherwise. In the present application, terms such as "comprises" or "consisting of" are intended to designate that the features, numbers, steps, operations, components, parts, or combinations thereof described in the specification exist, and it should be understood that the terms do not preclude the possibility of addition or existence of one or more other features or numbers, steps, operations, components, parts, or combinations thereof.

In one embodiment of the present disclosure, terms such as "module", "unit", "part", or the like are terms for designating a component that performs at least one function or operation, and these components may be implemented as hardware or software, or may be implemented as a combination of hardware and software. In addition, a plurality of "modules", "units", "parts", and the like are integrated into at least one module or chip and implemented with at least one processor, except when each needs to be implemented with individual specific hardware.

In addition, in one embodiment of the present disclosure, when a part is connected to another part, this includes not only direct connection but also indirect connection through another medium. In addition, the meaning that a certain part includes a certain component means that other components may be further included without excluding other components unless otherwise stated.

FIG. 1 is a diagram for explaining an operation in which a plurality of robots perform picking in each region within the picking zone and move to a packing zone (for example, packing station) according to one embodiment of the present disclosure.

In FIG. 1, it is assumed that various types of delivery objects are stored in each of a plurality of regions 11, 12, 21, 31, or the like included in the picking zone. The picking zone is a space where the stored delivery object is picked up, and the packing zone corresponds to a space where the delivered delivery object is packaged.

At this time, each of robots 100-1, 100-2, 100-3, and 100-4 can perform the role of loading the delivery object in the picking zone and moving the delivery object to the packing zone.

To this end, workers 10-1 and 10-2 designated to take charge of one or more regions existing in the picking zone may be located adjacent to each region in charge. Each of the workers 10-1 and 10-2 may be in charge of a plurality of regions, and when the robot arrives in the region in charge of each worker, each worker may load the delivery object to a loading box of the robot.

The loading box may be formed integrally with the robot, may be a loading box loaded separately on the robot, and a loading space of the robot itself may be used as the loading box. In this case, a region in charge may be divided for each worker, but at least one region may be managed in common by a plurality of workers.

Information on workers designated for each region may be stored in a server 200 that controls each robot, or may be stored in each of the robots 100-1, 100-2, 100-3, and 100-4.

Referring to FIG. 1, for example, a robot stop may be preset for each region, and each robot may arrive at a stop existing in front of a region in which a delivery object, which is a target of picking, is stored to perform loading. Here, the stop may be at least one point (stop point) or at least one area (stop area).

As such, at least a part of a series of processes for picking at least one delivery object may be defined as a task and assigned to each robot. For example, a first task for releasing a first delivery object may be assigned to the robot 100-1, and a second task for releasing a second delivery object may be assigned to the robot 100-2.

In this case, one task is not necessarily for picking one delivery object or one type of delivery object, and one task may include content for picking a plurality of delivery objects. In this case, in order to perform one task, the robot may sequentially move to a plurality of regions to load the plurality of delivery objects.

In addition, even when the task is not the location of the delivery object, the task may be configured to include to operations moving to various locations (stations) such as a location of a charging station, a standby location (for example, a standby station), an evacuation location (for example, an evacuation station), and a location of a packing station.

In addition, when the number of loading boxes included in one robot 100-1 is plural, different tasks may be assigned to each loading box, but it is of course also possible to assign a plurality of tasks to one loading box or to assign a task to two or more loading boxes. The number of loading boxes may be the same for all robots or may vary for each robot. When specifications of the robots agree with each other, the smaller the number of loading boxes in one robot, the larger the size of each loading box can be.

Prior to the operation of each robot picking the delivery object, the operation of assigning the task to each robot may be performed by the server.

Figure 2:
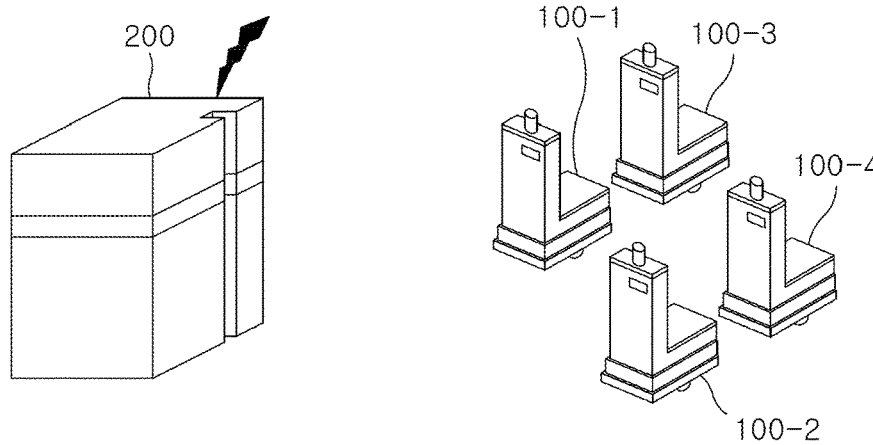
FIG. 2 is a diagram for explaining an operation in which a server assigns a task to a plurality of robots and controls a movement path according to one embodiment of the present disclosure.

In relation to this, FIG. 2 is a diagram for explaining the operation of the server that assigns tasks to the plurality of robots. The server 200 may correspond to a control server that controls the movement of each robot, such as monitoring the location information of the plurality of robots 100-1, 100-2, 100-3, and 100-4.

The server 200 may be implemented as at least one computer or system, but is not limited thereto. On the server 200, identification information of the plurality of robots, information on loading boxes included in the plurality of robots, and the like may be previously registered, and the server 200 may receive and monitor the location information of each robot in real time. Information on the loading box of one robot may include the number of loading boxes, identification information of each loading box, volume/size of each loading box, an internal capacity of each loading box, a maximum acceptable weight of each loading box, a location in the robot of each loading box, and the like.

The server 200 may create the task related to picking of the delivery object.

To do this, first, the information on the delivery object including identification information of the delivery object, a type of the delivery object, an expected delivery date of the delivery object, a region (for example, identification information, location, or the like) where the delivery object is stored, a size of the delivery object, the weight of the delivery object, precautions related to handling, and the like may be registered on the server 200. The information on delivery objects may be registered according to user input, and the information on each delivery object may be received in real time from an external server or database that manages delivery tasks. Alternatively, as a result (for example, Barcode scan, QR code scan, or the like) of scanning a shipment instruction related to the delivery of at least one delivery object through a scanner (for example, an image sensor, an infrared sensor, a barcode sensor, or the like) of at least one electronic device capable of communicating with the server 200, the task may also be created. In this case, the server 200 may create a task for picking the delivery object based on the information on the delivery object. For example, a series of processes in which one robot moves to the picking zone, the robot picks (loads) the delivery object, the robot moves to the packing zone, and the delivery object loaded on the robot is put down in the packing zone may be defined as a single task, but is not limited thereto.

Moreover, the server 200 may assign the created task to at least one robot. Since the plurality of tasks may be sequentially created (registered) on the server 200, the assignment may be performed in the order in which each task is created.

At this time, the server 200 may assign the task to the loading box of the robot. When the robot includes the plurality of loading boxes, the plurality of tasks may be assigned to one robot as a result of assigning tasks to each loading box.

Specifically, the server 200 may select one of the plurality of robots based on the information on the task assigned to each of the plurality of robots and a distance of each of the plurality of robots to the region in which the delivery object is stored.

As one embodiment, the server 200 may select at least one robot in which the number of remaining tasks being performed is less than a predetermined number among the plurality of robots. To this end, the server 200 may store information on the task assigned to each robot whenever a task is assigned to each robot, and conversely, when the assigned task is completed, information on the completed task may be excluded.

For example, it is assumed that the number of loading boxes included in each robot is 3 and one task is assigned to each loading box. In this case, at least one robot for which the number of tasks assigned at the present time is less than three (with an extra loading box) may be selected. As another example, at least one robot to which no task is assigned may be selected. Alternatively, at least one robot with the smallest number of tasks assigned at the present time and/or the largest number of extra loading boxes to which no tasks are assigned may be selected. In addition, the server 200 may select at least one robot that has the closest distance from the region in which the delivery object matching the task is stored.

At least one robot with one or more extra loading boxes and a relatively close distance from the region where the delivery object is stored may be selected and the task may be assigned to the robot.

As an example, the server 200 may select robots including at least one loading box to which a task is not assigned among the plurality of robots and select at least one robot that is closest to the region where the delivery object is stored among the robots.

In addition, the server 200 may select at least one loading box from among the loading boxes included in the plurality of robots based on the information on the delivery object, and assign a task to the selected loading box. That is, the task may be assigned to the robot including the selected loading box.

Specifically, the server 200 may select at least one usable loading box according to the size or weight of the delivery object, based on the internal capacity of each loading box, the maximum loadable weight, and the like. In this case, of course, the loading box to which no other task is assigned at this time should be selected.

However, the task assignment to the robot may be arbitrarily performed according to the user input (manual assignment). For example, as a result of one manager (or worker) scanning (for example, barcode scanning, QR code scanning, or the like) the delivery order for delivery of at least one delivery object on the scanner of the robot, the task may be assigned to the robot. When the task is assigned to the robot according to at least one of the above-described embodiments, the server 200 transmits information on the assigned task to the robot (the robot to which the task is assigned) to control the robot so that the robot moves to the region where the delivery object is stored.

The information on the task may include a date or time the task is performed, the identification information of the delivery object, the type of the delivery object, the size of the delivery object, the weight of the delivery object, the precautions related to handling of the delivery object, the location (for example, region) where the delivery object is stored, and the like.

Figure 3:
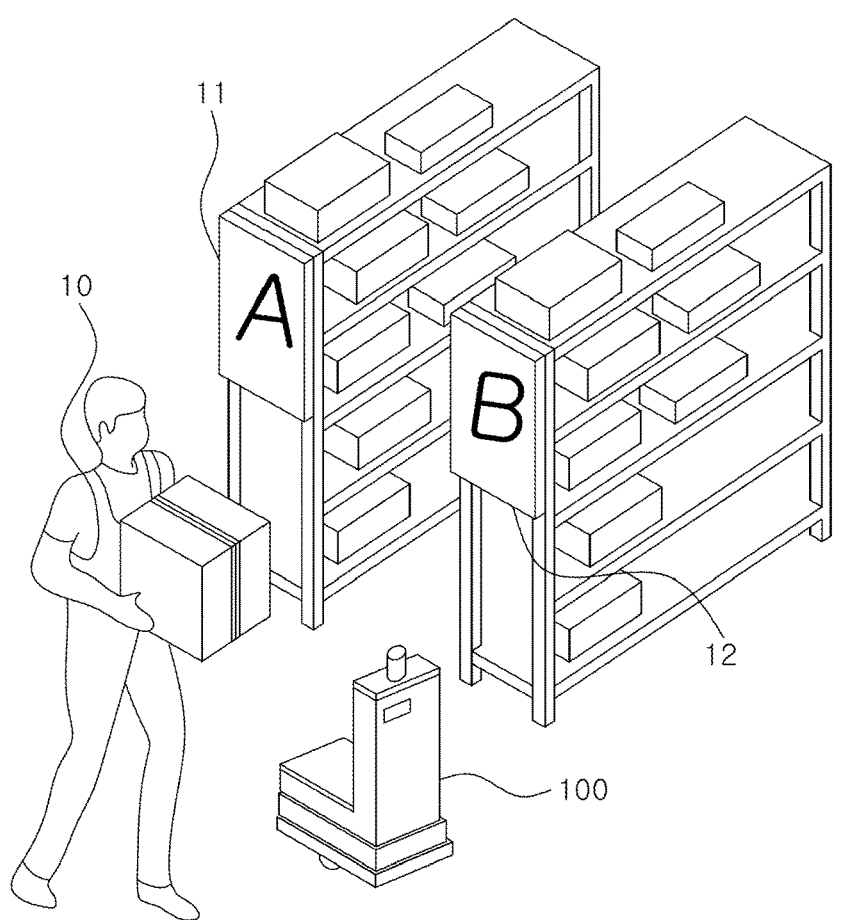
FIG. 3 is a diagram for explaining an operation of a robot supporting loading by moving to a region in which a delivery object is stored according to one embodiment of the present disclosure.

In relation to this, FIG. 3 is a diagram for explaining an operation in which the robot arrives at a region and performs the picking according to one embodiment of the present disclosure. The robot 100 of FIG. 3 is in a state in which at least one task is assigned by the server 200. Referring to FIG. 3, the robot 100 may receive information on the task assigned to the loading box included in the robot 100 from the server 200. When there are a plurality of loading boxes, the robot 100 may acquire information on the plurality of tasks assigned to the plurality of loading boxes.

At this time, the robot 100 may perform each task one by one according to the assigned order. Specifically, the robot 100 may move to the region where the delivery object matching the task is stored, and when the delivery object is loaded in the corresponding region, the robot may move to the packing region. Here, when the unloading of the delivery object in the packing region is completed, it may be identified that the task is completed.

For example, as shown in FIG. 3, the robot 100 may identify a region (for example, region B(12)) in which the delivery object, which is a target of the picking, is stored, and move to the corresponding region 12. Specifically, the robot 100 may move to a preset stop for the corresponding region 12.

Here, the robot 100 may select at least one stop point that is not occupied by at least one other robot among a plurality of (preset) stop points adjacent to the corresponding region (for example, 12). In this case, the robot 100 may set a priority for stopping at each of the selected stop points based on the distance of the robot to each of the selected stop points. For example, the closer it is, the higher the priority may be set. In addition, the robot 100 may stop at a stop point of the highest priority according to the set priority.

Alternatively, a stop area adjacent to each region may be preset. In this case, the robot 100 may stop in a stop area adjacent to the region (for example, 12) in which the delivery object is stored. However, when at least one object (ex. another robot, obstacle, human (ex. worker/manager, or the like)) exists in the corresponding stop area, the robot 100 may identify the object and stop at a point spaced apart from the identified object by a certain distance or more within the stop area.

Moreover, according to one embodiment, the robot 100 may perform a wait for a certain time while moving according to the location of another robot that targets at least one region designated for the worker in the region where the delivery object is stored.

Specifically, in the process of the robot 100 moving to the region matching the task in progress, the robot 100 or server 200 may monitor the location of another robot that targets at least one region designated for the worker of the corresponding region. For example, when a plurality of robots targeting the region managed by the same worker exist, the server 200 may receive and monitor the location information of each robot 100. In this case, the server 200 may share the location information of each robot with other robots.

Alternatively, the robot 100 may detect the presence and location of at least one other robot in the vicinity through a sensor unit of the robot 100.

In one embodiment, when another robot has already been located on the path for entering the region where the delivery object of the task assigned to the robot 100 is stored, the robot 100 may wait without entering the corresponding path until the above-described other robot leaves the corresponding path.

For example, when multiple regions face a narrow passage as shown in FIG. 1, it is impossible for two or more robots to cross each passage, and it may be difficult to operate on the passage when one end of the passage is blocked. As a specific example, this situation corresponds to the case where another robot is located in the path between the region 21 and the region 31 while moving to the region 21 in FIG. 1. In this case, the robot 100 according to the above embodiment monitors the location of other robots described above to avoid duplication of paths, and thus, it facilitates the movement of workers and other robots, and can avoid blockages in movement.

When the robot arrives at a stop according to at least one of the above-described embodiments, the robot 100 may visually/audibly output the information on the delivery object and the information on a loading box.

For example, the robot 100 may output various information such as the identification number of the delivery object, the identification number of the region where the delivery object is stored, the storage location of the delivery object in the region, the type of delivery object, the quantity of the delivery object, and other characteristics (for example, handling precautions, liquids, danger, or the like) of the delivery object, and the like. In addition, when the robot 100 includes the plurality of loading boxes, the robot 100 may output the information (for example, loading box number, loading box order, loading box color, loading box location in robot 100, or the like) on the loading box in which the delivery object is to be loaded among the plurality of loading boxes.

As a specific example, the robot 100 may first output information on the delivery object. In this case, the worker 10 who has checked the information on the delivery object through the robot 100 may pick up the delivery object stored in the corresponding region 12 and load the delivery object into the loading box of the robot 100. The worker may scan at least a part (for example, barcode) of the delivery object through the scanner of the robot 100, and as a result, the robot 100 may scan at least a part of the delivery object through the scanner to obtain scan data. For example, the barcode attached to the delivery object may be recognized to identify the information on the delivery object. Alternatively, the information on the delivery object may be obtained by interworking on a web page through a barcode or QR code attached to the delivery object.

In this case, the robot 100 may compare the information on the delivery object matching each task currently assigned to the robot 100 with the information on the delivery object included in the scan data.

As a result of the comparison, when the task and the loading box matching the delivery object are identified, the robot 100 may output information on the loading box matching the scanned delivery object. For example, the order, color, identification number, or the like of the loading box may be provided. As a result, the worker can load the delivery object into the corresponding loading box.

However, it is of course also possible for the robot 100 to simultaneously output the information on the delivery object and the information one the loading box. In this case, the worker who has checked the information on the delivery object may take out the delivery object and load the delivery object in the loading box.

Meanwhile, when the delivery object is not loaded on the robot 100 for a certain period of time after the robot 100 arrives at the region where the delivery object is stored, the server 200 may provide the location information on the robot to a worker terminal of a worker located the region where the delivery object is stored. In this case, the server 200 may request loading of the delivery object on the robot 100 with the worker terminal.

Meanwhile, a system for performing one or more tasks according to one embodiment of the present disclosure may include the server 200 and the plurality of robots as shown in FIG. 2 described above.

In this case, as described through the above-described embodiment, the server 200 may assign at least one task among the plurality of tasks to the at least one robot 100 among the plurality of robots. In this case, the server 200 may determine a path for arranging the robot to a first location where at least one delivery object assigned to the corresponding robot is stored, and guide the robot to the first location according to the determined path. An example of such an operation corresponds to FIG. 3 described above.

Here, the server 200 according to one embodiment of the present disclosure may guide the robot 100 arranged in the first location to a second location different from the first location. Specifically, referring to FIG. 4a, the server 200 may guide (S420) the robot 100 to the second location when at least one event preset to cause a location movement for the corresponding robot 100 occurs (S410).

Here, the second location may correspond to a location where the delivery object included in the new task (another task assigned to the robot 100) is stored, a location of the packing station where the delivery object loaded in the robot 100 is unloaded, and a location of a charging station where the robot is charged.

The second location may be selected according to a user input. Specifically, the server 200 may create at least one task according to the user input, and determine a path for arranging the robot 100 to the second location related to the created task. The user input may be received through the user inputter 170 provided in the robot 100. Specifically, one of "perform the next task", "Move to the packing station", and "move to the charging station" may be selected through a display (for example, touch panel) provided in the robot 100.

As one embodiment of moving to the second location, when the loading of the delivery object to the robot 100 is confirmed at the first location, the server 200 may move to the second location.

In this case, the robot 100 may check the loading of the delivery object to the loading box of the robot 100 while the loading is performed at the first location. Specifically, the robot 100 may automatically identify (for example, using a sensor that detects the presence/weight/volume of the delivery object inside the loading box) that the loading of the delivery object in the loading box has been completed through a sensor unit 160, and a worker's user command (for example, button input, voice command, touch command, or the like) notifying the completion of loading may be input to the robot 100.

As one embodiment in which the robot 100 moves to the second location, the robot 100 may scan the identification mark attached to the delivery object through the scanner 180. In this case, when scanning for identification marks of all delivery objects included in the task is completed, the server 200 may assign a new task to the robot 100. As a result, the robot 100 may move to the second location where the delivery object related to the assigned new task is stored.

As one embodiment in which the robot 100 moves to the second location, when all delivery objects corresponding to all tasks assigned to the robot 100 are loaded, the robot 100 may move to the packing station (second location) for packing the delivery object. Alternatively, even when there is no more free loading box/loading space in the robot 100, the robot 100 may move to the packing station (second location) for packaging the delivery object.

Here, the determination of whether the loading of the delivery object to the robot 100 is complete and/or whether there is a free space may be performed through at least one sensor (for example, a weight sensor, a volume sensor, or the like) provided in the robot 100. Alternatively, a user input for confirming that the loading of the delivery object is completed and/or there is no free space may be received by the robot 100.

In this case, the user input may be input (for example, button input, touchpad operation, voice command, or the like) by the worker who has finished loading the delivery object or confirmed that there is no more free space or may be input by the loading robot (for example, robot arm, vision system, or the like) that performs the loading of the delivery. Specifically, when the loading robot installed at the location where the delivery object is stored to perform loading of the delivery object has finished the loading of the delivery object matching the task assigned to the robot 100 and/or it is confirmed that there is no more free space in the loading box of the robot 100, the user input may be performed by manipulating buttons or touchpads of the robot 100 through the robot arm.

As such, when the loading is completed and/or there is no more free space, the robot 100 may move to a packing region matching classification criteria (for example, size, shape, material, weight, or the like) of the delivery object loaded in the robot 100 among the plurality of packing regions constituting the packing station. To this end, the packing region can be classified according to various properties such as the size, shape, material, and weight of the delivery object that is the target of packaging.

As one embodiment in which the robot 100 moves to the second location, when the weight of the delivery object loaded on the robot 100 exceeds a reference weight or when a load greater than the reference value is applied to a certain area by the delivery object loaded on the robot 100, the robot 100 may move to the second location. Here, the second location may correspond to a packing station for unloading the loaded delivery object. To this end, the robot 100 may include a weight sensor for detecting a load for each loading box provided in the robot 100 or a load for each area of each loading box.

Moreover, even when the volume (including the loaded delivery object) of the robot 100 exceeds a reference volume as a result of loading the delivery object, the robot 100 may move to the second location for unloading. In this case, the robot 100 may identify the volume according to the size and quantity of the loaded delivery object, but is not limited thereto.

As one embodiment in which the robot 100 moves to the second location, when a work end time of the worker and/or the robot 100 reaches, the server 100 may guide the robot 100 to the second location corresponding to the standby location. Specifically, the server 100 may guide the robot 100 to the standby station closest to the current location of the robot 100.

In one embodiment in which the robot 100 moves to the second location, when a preset emergency situation occurs, the server 200 may guide the robot 100 to the second location corresponding to the evacuation location (for example, standby station, charging station, other external space, or the like) closest to the current location of the robot 100. The emergency situation may be a case where a disaster or accident occurs in the work space where the robot 100 is located, a case where at least one worker in the work space where the robot 100 is located is injured, a case where a natural disaster, such as an earthquake, that may cause damage to the work space, or the like. In order to detect an emergency situation, the server 200 may communicate with a disaster warning system in the work space, various terminal devices of workers or managers, a weather data-related server, and the like.

In addition, the worker's user command to control the movement to the second location (for example, the location where the delivery object of the next task is loaded, a waiting place (for example, general station, charging station), or the packing station, or the like) may be input the robot 100 regardless of the loading completion.

This is to control the movement of the robot by the worker's own determination when there is an abnormality such as when a malfunction occurs in the robot, when the robot causes inconvenience to the worker, or when the robot causes inconvenience to cleaning.

In this case, the server 200 can monitor the status of the robot 100 moving to another location while loading is stopped, and select at least one other robot to assign newly the stopped task (robot 100). Here, the other robots may be at least one of the robot that is located closest to the region where the loading of the robot 100 is stopped, the robot that can move to the region most quickly after completing the ongoing task or loading, and the robot that performs the unload of the delivery object in the packing region most recently. In this case, the other robots mentioned above may be sent to the corresponding region to perform the stopped task. Meanwhile, after the robot 100 completes the loading in one region, before the robot 100 moves to the region related to the next task or moves to the packing region, the robot 100 may provide arrival information of other robots related to the worker.

Specifically, when the loading of the delivery object to the robot 100 is completed, the server 200 may identify at least one other robot that has arrived at the region in which the delivery object is stored. In addition, the server 200 may identify at least one other robot that has arrived in another region designated for the worker in the region where the delivery object is stored.

In this case, the server 200 may control the robot 100 to output location information of the other identified robots.

As a result, the robot 100 in which the loading of the delivery object is completed may provide arrival information of at least one other robot.

Figure 4A:
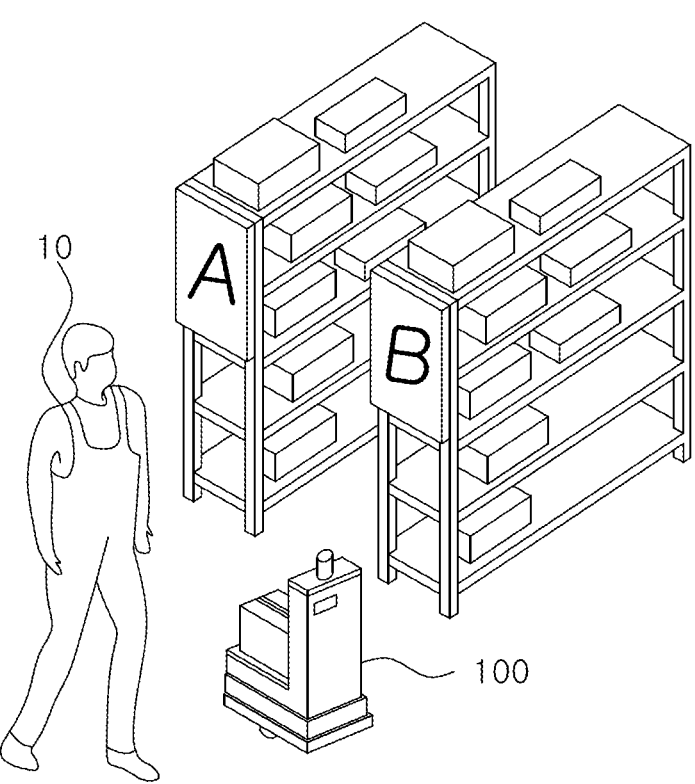
FIG. 4a is a diagram for explaining an operation of a robot moving to another location by detecting an event related to location movement during task execution (or after task completion) in a system including a robot and a server according to one embodiment of the present disclosure.
Figure 4B:
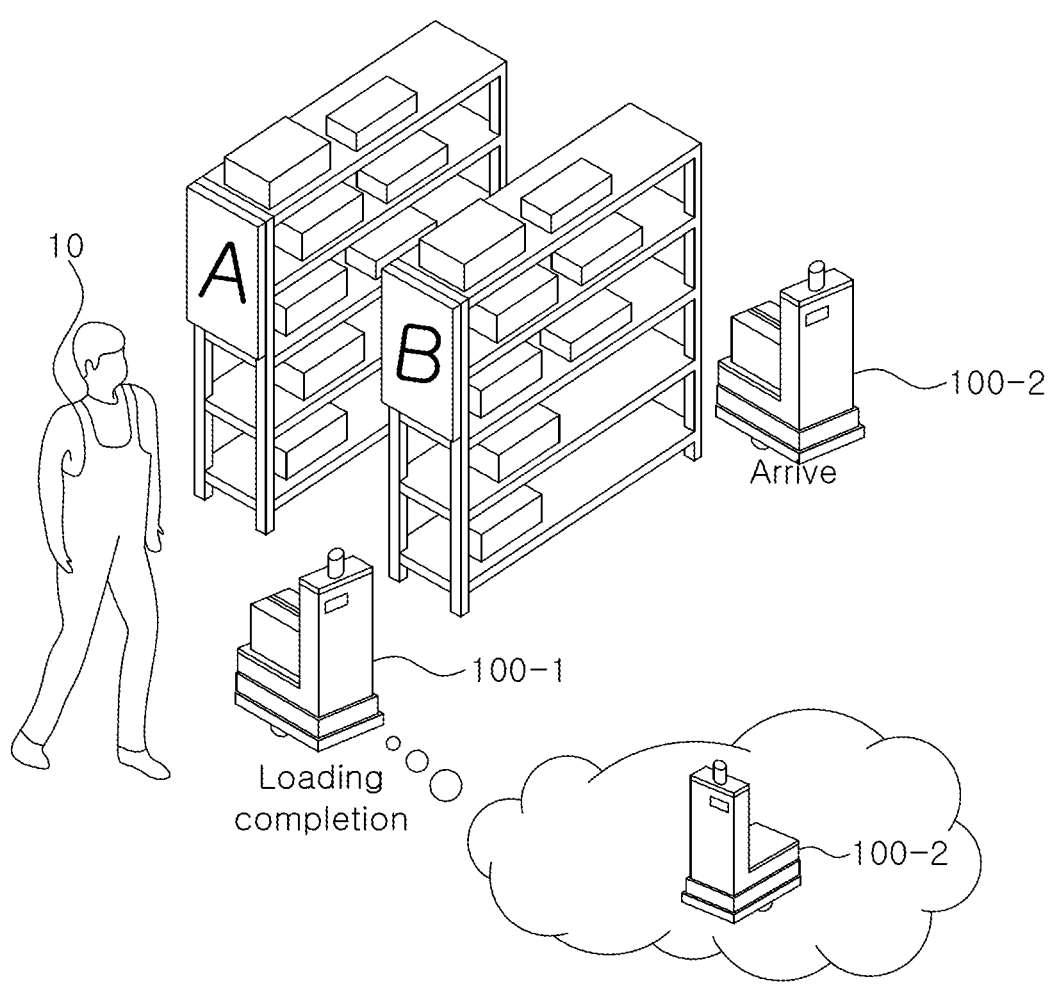
FIGS. 4b and 4c are diagrams for explaining an operation of notifying arrival of another robot adjacent to the robot immediately after loading, according to one embodiment of the present disclosure.
Figure 4C:
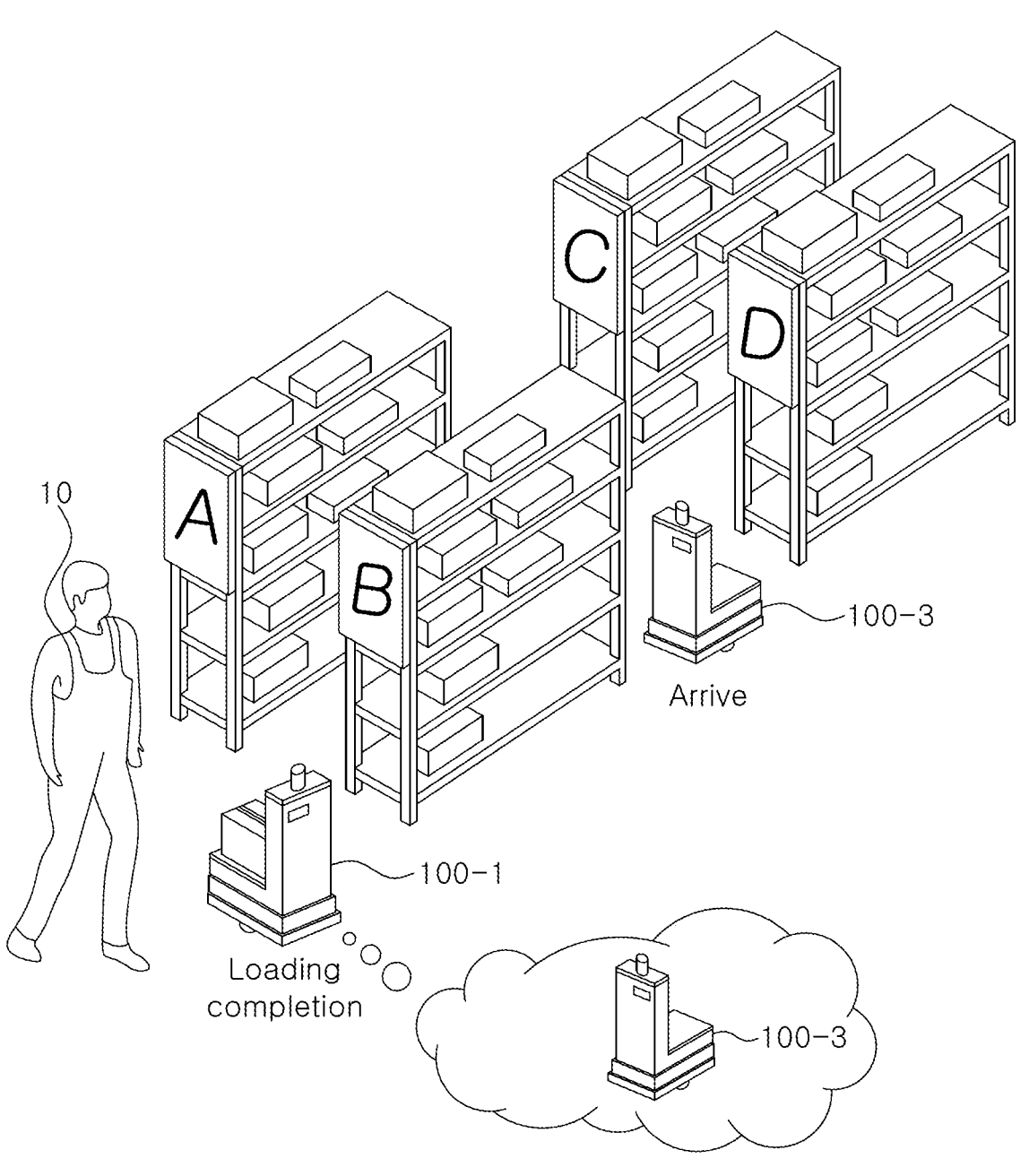

In relation to this, FIGS. 4*b* and 4*c* are diagrams for explaining the operation of the robot that notifies the arrival of another robot according to one embodiment of the present disclosure.

In FIGS. 4*b* and 4*c*, a situation is assumed, in which the loading of the delivery object stored in the region B with respect to the robot 100-1 is completed. Specifically, when the worker 10 loads the delivery object of the region B in the loading box of the robot 100-1, the robot 100-1 may detect the loaded delivery object. In this case, when the input of the worker confirming the completion of loading is received, it can be switched to the status of loading completion. At this time, the robot 100-1 may identify at least one other robot that has arrived at at least one area designated for the same worker 10 or is scheduled to arrive within a certain time, and provide arrival information or location information of the other robot described above. To this end, the robot 100-1 may receive location information of various robots in real time from the server 200 or the like.

In FIG. 4*b*, a situation is assumed in which another robot 100-2 arrives in the region area B after completion of loading of the robot 100-1. In this case, the robot 100-1 may visually/audibly output information notifying that the robot 100-2 has arrived in the region B. In this case, identification information of the robot 100-2, information on a delivery object to be loaded in the robot 100-2, location information of the robot 100-2, and the like may be displayed. As a result, the worker 10 may move to perform the loading task for the robot 100-2. In this case, the robot 100-1 may move to the region or packing region in which the delivery object matching the next task is stored.

In FIG. 4*c*, after the loading of the robot 100-1 is completed, the arrival information of another robot 100-2 that has arrived in another region D managed by the worker 10 may be output. Specifically, the robot 100-1 may visually/audibly output information indicating that the robot 100-3 has arrived in the region D. In this case, identification information of the robot 100-3, information on a delivery object to be loaded in the robot 100-3, location information of the robot 100-3, and the like may be displayed. As a result, the worker 10 may move to the region D and load the delivery object requested by the robot 100-3. In this case, the robot 100-1 may move to the region or packing region in which the delivery object matching the next task is stored.

As such, the server and/or robot according to the present disclosure provides the arrival information/location information of another robot immediately after the loading of one robot in the parking region is completed, thereby increasing work efficiency of the worker performing the loading in the parking region.

After loading, in the process of moving the robot 100 to the packing region, the robot 100 may move to a region with the smallest number of currently located robots among a plurality of regions included in the packing region. To this end, the server 200 may monitor the location of each robot located in the packing region, and may select a region in which the robot 100 loaded with the delivery object will move.

In addition, when the packing region includes a plurality of regions divided according to the type of delivery object, the robot 100 may identify one or more regions in which each delivery object is unloaded according to each type of the currently loaded delivery objects, and move sequentially to the identified region. Here, the type of delivery object may be classified according to various attributes of the delivery object, such as a type, weight, a volume, and a delivery area of a product.

When the unloading of the entire delivery object loaded in the robot 100 in the packing region is performed, the robot 100 may identify task completion. Specifically, the robot 100 detects the presence/weight of the delivery object in the loading box through a weight sensor, a volume sensor, an infrared sensor, or the like to identify whether the delivery object is unloaded, and when all the loaded delivery objects are unloaded, the robot 100 may identify task completion. Alternatively, the robot 100 may identify the task completion when receiving the user command from the worker (of the packing region) that confirms the task completion after unloading of the loaded delivery object.

After the task is completed, the robot 100 can move to at least one preset waiting place (for example, general station), the charging station for charging, and the like. The charging station is connected to the robot 100 and includes at least one charging terminal for supplying power in a wired or wireless manner.

In one embodiment, after the task is completed, the robot 100 may move to a waiting place close to the region in which delivery objects related to a preliminary task and a suspended task that have not yet been assigned are stored the most.

Alternatively, after the task is completed, the robot 100 may move to a specific waiting place preset for the robot 100.

Alternatively, immediately after the task is completed, the robot 100 may stop and wait at the point where the task is completed until a new task is assigned.

Moreover, according to one embodiment, when a remaining amount of power of the robot 100 is less than or equal to a threshold amount of power after the task is completed, the robot 100 may move to the charging station for charging. Meanwhile, one embodiment in which the charging station for charging is provided in each of a plurality of regions included in the packing region is also possible. That is, while the robot 100 is charging, the unloading of the delivery object in the robot 100 may be performed by the worker.

In this way, after completing all assigned tasks, the movement of each robot may be be set according to the user input for each robot, and the moving place set for each robot may be different.

Figure 5:
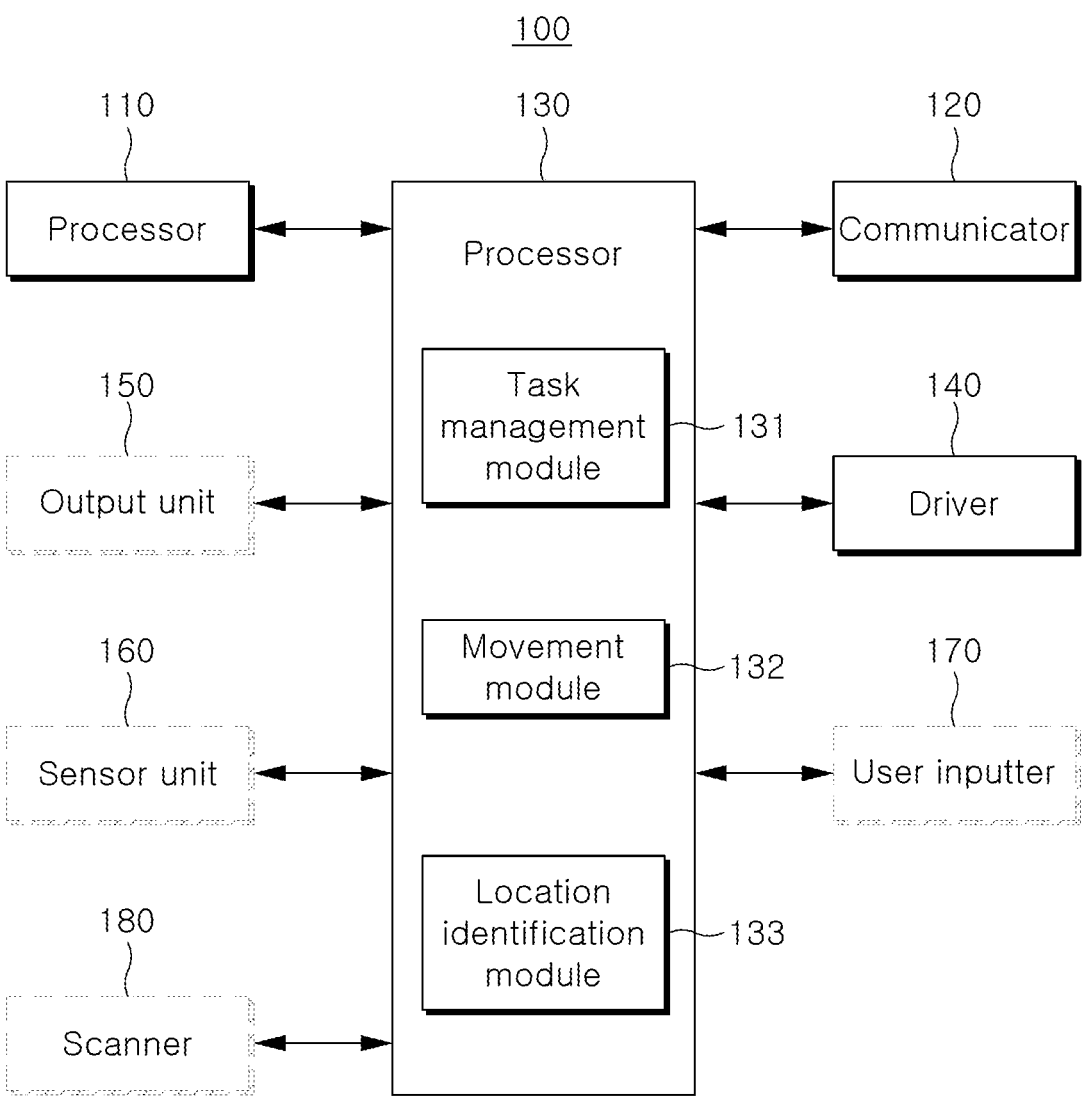
FIG. 5 is a block diagram for explaining the configuration of a robot according to one embodiment of the present disclosure.

Meanwhile, FIG. 5 is a block diagram for explaining the configuration of a robot according to one embodiment of the present disclosure.

Referring to FIG. 5, the robot 100 may include a memory 110, a communicator 120, a processor 130, a driver 140, and the like.

The robot 100 is configured to load and transport the delivery object, and corresponds to a mobile robot having a moving means.

As an example, the robot 100 is equipped with one or more wheels and a motor while being able to move on land. In this case, the robot 100 can move along the floor, as well as move by riding on a moving facility such as an elevator or an escalator.

The robot 100 may perform charging on at least one charging station. In the standby state, the robot 100 may be connected to a charging terminal of the charging station to receive power. The memory 110 is a configuration for storing an operating system (OS) for controlling the overall operation of the components of the robot 100 and at least one instruction or data related to the components of the electronic device 100.

The memory 110 may include non-volatile memory such as ROM and flash memory, and may include volatile memory such as DRAM. In addition, the memory 110 may include a hard disk, a solid-state drive (SSD), or the like.

The memory 110 may include information on at least one task assigned to the robot 100. The task may mean a task of picking at least one delivery object from the picking zone and transferring the delivery object to the packing zone. For example, a separate task may be assigned to each loading box provided in the robot 100.

Assignment of tasks to the robot 100 may be received through the server 200 that controls the robot 100, for example, the robot 100 may communicate with the server 200 through the communicator 120 to receive the assignment of the task.

The communicator 120 may include circuits, modules, chips, or the like for performing communication with at least one external device in various wired/wireless communication methods. In order to secure mobility of the robot 100, the communicator 120 may include various circuits/modules/chips for performing wireless communication.

The communicator 120 may be connected to an external device through various networks.

The network may be a personal area network (PAN), a local area network (LAN), a wide area network (WAN), or the like according to the area or size, and may be Intranet, Extranet, or Internet according to openness of the network.

The communicator 120 may be connected to an external device through various wireless communication methods such as long-term evolution (LTE), LTE Advance (LTE-A), 5th generation (5G) mobile communication, code division multiple access (CDMA), wideband CDMA (WCDMA), universal mobile telecommunications system (UMTS), Wireless Broadband (WiBro), Global System for Mobile Communications (GSM), Time Division Multiple Access (DMA), Wi-Fi (WiFi), WiFi Direct, Bluetooth, near field communication (NFC), and Zigbee.

Through the communicator 120, the robot 100 may communicate with the server 200 as well as communicate with other robots included in the same system. In addition, the robot 100 may communicate with one or more worker terminals 300-1 and 300-2 through the communicator 120.

The processor 130 is configured to control the robot 100 as a whole. Specifically, the processor 130 may perform operations according to various embodiments of the present disclosure by executing at least one instruction stored in the memory 110 while being connected to the memory 110.

The processor 130 may include a general-purpose processor such as a CPU, an AP, or a digital signal processor (DSP), a graphics-only processor such as a GPU, a vision processing unit (VPU), or the like, an artificial intelligence-only processor such as an NPU, or the like. The AI-only processor may be designed with a hardware structure specialized for training or use of a specific AI model.

The driver 140 is configured to drive the movement of the robot 100. The driver 140 may correspond to a module implemented in software and/or hardware.

For example, the driver 140 may control a motor for driving the wheels of the robot 100 and may control a mechanical configuration for controlling the direction of the wheels. For example, linear driving, curved driving, and rotation of the wheel may be controlled. Referring to FIG. 5, the processor 130 may control a task management module 131, a movement module 132, a location identification module 133, and the like. Each of these modules may be implemented in software and/or hardware, and the operation of the processor 130 is divided according to functions and expressed in blocks. However, it goes without saying that the classification of functions can be done in various other ways, and thus, is not limited to the functional blocks of FIG. 2.

The task management module 131 is a module for managing the information on the task assigned to the robot 100. The task may be assigned for each loading box provided in the robot 100.

The task management module 131 may identify the information on the delivery object to perform each task, and identify the region in which a delivery object is stored according to the information on the delivery object.

The task management module 131 may monitor the progress of each task. The progress state may be divided into, for example, before progress, in progress, task completion, and the like. The above-mentioned "in progress" state may be divie3d into three states such as a first state in which the robot 100 is moving to the area where the delivery object is stored, a second state in which the robot 100 arrives at the corresponding region and waits for loading, and a third state in which the loading is performed and the robot 100 is moving. Here, the third state may be subdivided again into a state in which the robot is moving to the region in which other delivery objects are stored in a state where the loading has been performed, and a state where the robot is moving to the packing region.

The movement module 132 is a module for controlling the movement of the robot 100. The moving module 132 may drive the moving means of the robot 100 through the driver 140.

For example, the movement module 132 may control the driver 140 to move to the region matching the task assigned to the robot 100. Moreover, when loading in the corresponding region is completed, the moving module 132 may control the driver 140 so that the driver moves to the packing region.

As a result of assigned tasks for each loading box, when a plurality of tasks are assigned to the robot 100, the moving module 132 may control the driver 140 so that the driver sequentially moves to each region according to the priority of each task. For example, the robot 100 may operate in such a way that when loading is completed in one region, the robot moves to the next region. In this case, the priority may be set by the robot 100 or the server 200, and a related embodiment will be described later in relation to the operation of the server 200.

The location identification module 133 is a module for monitoring the location information of the robot 100 and the location information of other robots.

The location identification module 133 may identify the location of the robot 100 through a global positioning system (GPS) system provided in the communicator 120. Alternatively, the location identification module 133 may identify the location of the robot 100 based on the strength of a signal received from at least one relay device and the location of the relay device. The location identification module 133 may receive location information of each of the other robots from the server 200 or other robots through the communicator 120.

Moreover, referring to FIG. 5, the robot 100 may further include at least one of an output unit 150, a sensor unit 160, a user inputter 170, and a scanner 180.

The output unit 150 is configured to visually/audibly output various information. The output unit 150 may include a display, an LED, a speaker, and the like.

For example, the robot 100 may display information on a delivery object that is a picking target through the display of the output unit 150. In addition, the robot 100 may display information (for example, serial number, order, location in the robot 100, or the like) on the loading box in which the delivery object is to be loaded through the display. Moreover, the robot 100 may audibly output information on the delivery object or information on the loading box through a speaker of the output unit 150.

As another example, when the robot 100 includes a plurality of loading boxes, a separate LED may be provided for each loading box. In this case, the robot 100 may induce light output by selectively driving an LED attached to the loading box on which the delivery object is to be loaded among the plurality of loading boxes. As a result, the worker can determine which loading box to load the delivery object into.

The sensor unit 160 is configured to collect various information related to the movement of the robot 100 or the loading of the robot 100.

The sensor unit 160 may include various sensors for identifying at least one external object proximate to the robot 100, such as a lidar sensor, a proximity sensor, and a camera (RGB camera, depth camera, or the like).

The sensor unit 160 may include various sensors related to a speed, direction, and posture of the robot 100, such as an acceleration sensor, a geomagnetic sensor, and a gyro sensor.

The sensor unit 160 may include a camera for acquiring an image of the delivery object loaded in the loading box.

In addition, the sensor unit 160 may include a weight detection sensor, a volume detection sensor, a temperature sensor, or the like for acquiring various information such as the weight, volume, and temperature of the delivery object loaded in the loading box. The weight sensor, the volume sensor, the temperature sensor, or the like may be implemented according to a variety of conventionally used technologies or various technologies to be devised in the future. The volume sensor may include, for example, one or more light output devices and one or more optical sensors installed in the loading box, and the volume/size of the delivery object may be detected based on the reflected light, but is not limited thereto.

The user inputter 170 is configured to receive various user commands or information. The user inputter 170 may include at least one button, a touch pad, a microphone, a camera (facial recognition, motion sensing), and the like.

The scanner 180 is a component for collecting data related to the delivery object by scanning at least a part of the delivery object. The scanner 180 may be implemented as a camera, an infrared sensor, or the like, but is not limited thereto.

For example, the scanner 180 may include a scanner for scanning code information (for example, barcode, QR code, or the like) of the delivery object. The scanner may be provided as an external type scanner for scanning the code information of the delivery object located outside of the robot 100, or may be provided as a built-in type scanner for scanning the code information of the delivery object loaded in a loading box.

In one embodiment, when the robot 100 is provided with the plurality of loading boxes, the robot 100 may identify the plurality of regions in which the plurality of delivery objects related to the plurality of tasks are stored based on information on the plurality of tasks assigned to the plurality of loading boxes.

In this case, the robot 100 may set a priority for moving to the plurality of regions based on a robot density of each of the plurality of region and a movement distance for the robot 100 to move to each of the plurality of regions. In this case, the process of setting the priority may be performed through the server 200.

The robot density indicates the density of robots for each region, and conceptually, it is a concept related to the number of robots to which the task related to each region is assigned. Specifically, the robot 100 may identify the number of loading boxes matching each of the plurality of regions based on information on the loading box of each robot to which the task matching each of the plurality of regions is assigned. In addition, the robot 100 may acquire the robot density for each region according to the number of loading boxes (the number of tasks) identified for each region. Here, for each region, the higher the number of identified loading boxes, the higher the robot density can be calculated.

In this case, the robot 100 may set a lower priority in a region with a higher robot density. In this way, it is possible to prevent a situation in which robots are clustered around the region. Meanwhile, the robot 100 may set the robot density of each of the regions designated for the same worker to be the same based on the information on the worker in charge of each of the plurality of regions included in the picking zone.

For example, the robot density of the region with the highest robot density among the regions designated for one worker is identified, and the robot density of all regions designated for the worker can be set according to the identified robot density. In that the subject that loads delivery object for each robot is the worker, it has the effect that the actual congestion level is reflected based on the loading task of the worker.

In addition, the robot 100 compares the current location of the robot 100 with the locations of each of the plurality of regions to identify the moving distance, and the shorter the moving distance, the higher the priority.

When the priority is set according to at least one of the above-described embodiments, the robot 100 may sequentially visit the regions in which the delivery object of each task is stored according to the set priority.

Figure 6:
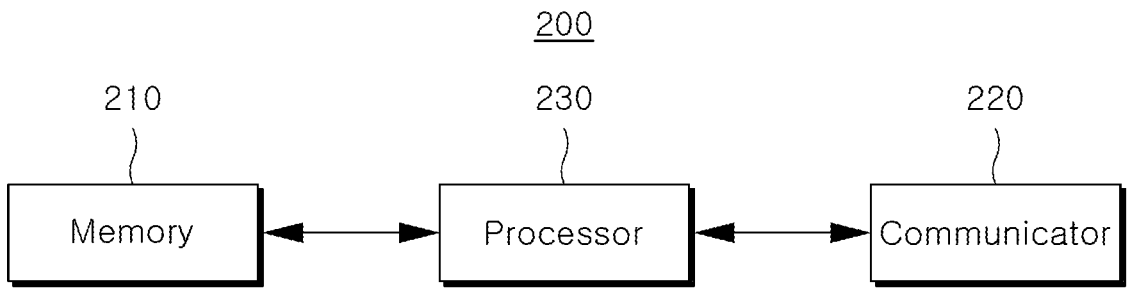
FIG. 6 is a block diagram for explaining the configuration of a server according to one embodiment of the present disclosure.

Meanwhile, FIG. 6 is a block diagram for explaining the configuration of the server 200 according to one embodiment of the present disclosure. Referring to FIG. 6, the server 200 may include a memory 210, a communicator 220, a processor 230, and the like.

The memory 210 is a configuration for storing at least one instruction or data related to an operating system (OS) for controlling the overall operation of the components of the robot 100 and components of the electronic device 100. The memory 110 may include non-volatile memory such as ROM and flash memory, and may include volatile memory such as DRAM. In addition, the memory 110 may include a hard disk, a solid-state drive (SSD), or the like. The memory 210 may include information about various tasks. Specifically, the memory 210 may include information on a preliminary task that has not yet been assigned, information on the task assigned to at least one robot, information on a completed task, and the like, respectively.

The communicator 220 may include circuits, modules, chips, or the like for performing communication with at least one external device in various wired/wireless communication methods.

Through the communicator 220, the server 200 may control the task and movement of the robot by performing communication with the plurality of robots.

The processor 230 is a configuration for controlling the server 200 as a whole. Specifically, the processor 230 may control the operation of the server 200 according to various embodiments of the present disclosure by executing at least one instruction stored in the memory 210 while being connected to the memory 210. The processor 230 may include a general-purpose processor such as a CPU, an AP, or a digital signal processor (DSP), a graphics-only processor such as a GPU, a vision processing unit (VPU), or the like, or an AI-only processor such as an NPU. The AI-only processor may be designed with a hardware structure specialized for training or use of a specific AI model.

As described above, the server 200 may assign one or more tasks to each of a plurality of robots (for example, 100-1, 100-2, 100-3, 100-4, or the like). In addition, the server 200 may control the movement path of the robot to which the task is assigned in real time, and may set the movement path of the robot that has completed the assigned task or assign an additional task to the corresponding robot.

In one embodiment, based on information on a region in which a delivery object matching each of a plurality of preliminary tasks that has not been assigned is stored, the server 200 may select at least one region related to the largest number of preliminary tasks. Alternatively, the server 200 may select at least one region related to the first generated task among a plurality of preliminary tasks.

Here, when one robot has performed all tasks assigned to the corresponding robot (for example, after the corresponding robot loaded with the delivery object moves to the packing region, unloading of the delivery object from the robot is completed), the server 200 may control the robot so that the robot moves to at least one standby location matching the selected region.

As a result, the robot may move to the standby location close to the region related to the preliminary tasks to be assigned later, and the assignment of the next task may be performed efficiently.

Figure 7:
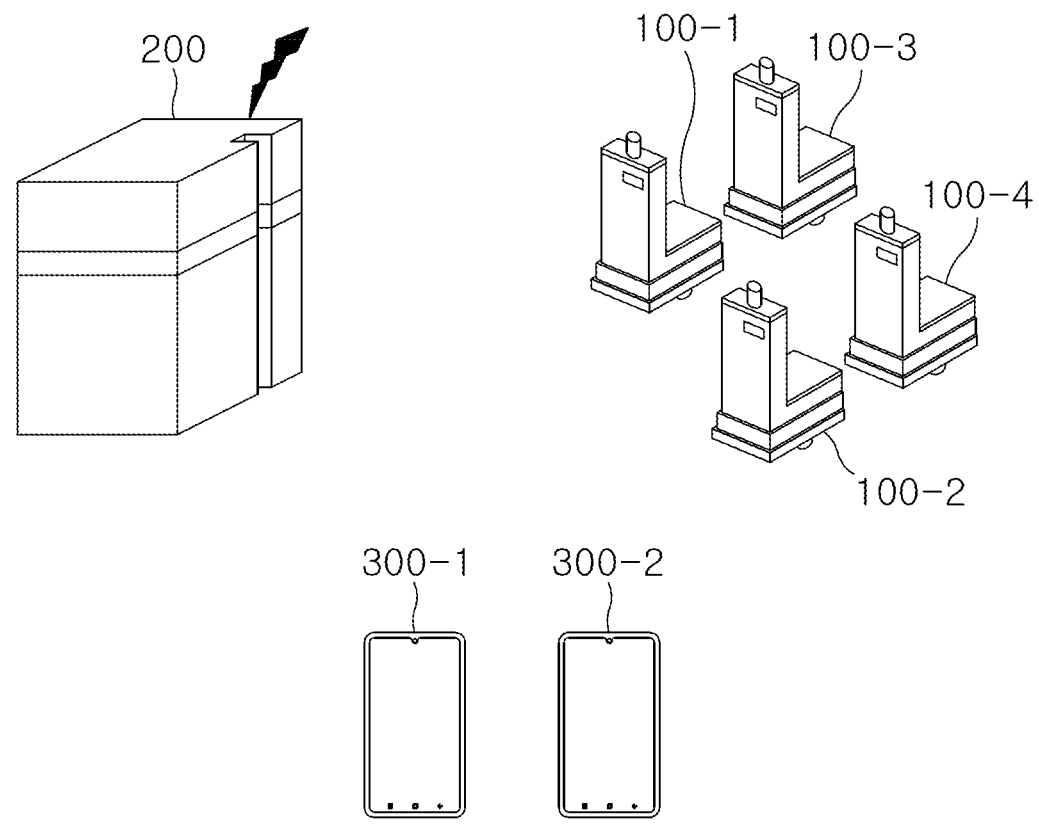
FIG. 7 is a diagram for explaining an operation in which a server performs communication with a plurality of robots or a plurality of worker terminals according to one embodiment of the present disclosure.

Meanwhile, FIG. 7 is a diagram for explaining an operation in which a server performs communication with a plurality of robots or a plurality of worker terminals according to one embodiment of the present disclosure.

Referring to FIG. 7, the server 200 may control the plurality of robots 100-1, 100-2, 100-3, and 100-4, and communicate with the worker terminals 300-1 and 300-2 of workers performing loading in various regions.

As one embodiment, the server 200 may acquire a plurality of task groups by clustering the plurality of tasks related to picking of the delivery objects according to the location of the region in which each delivery object is stored. In other words, it is highly probable that tasks for delivery objects stored relatively close belong to the same group.

As a specific example, the server 200 may perform clustering so that the distance between regions in which the delivery objects of tasks included in each task group are stored is minimized. In this case, the server 200 may perform the clustering based on an algorithm that minimizes variance of the distance difference, such as k-means clustering, but is not limited thereto.

Here, the number of tasks included in each task group may be the same as the number of loading boxes included in each of the robots 100-1, 100-2, 100-3, and 100-4.

In addition, the server 200 may assign the plurality of task groups to the plurality of robots 100-1, 100-2, 100-3, and 100-4.

As a result, each of the robots 100-1, 100-2, 100-3, and 100-4 may sequentially visit the regions that are close to each other, and as a result, efficiency can be secured in the movement and loading process of each robot.

In the assignment process, the server 200 may select an optimal robot for each task group. Specifically, the server 200 may select a robot closest to the average location of the regions of the tasks included in the task group.

In addition, the server 200 may receive information on the remaining battery level of each robot from each robot, and may assign the task group only to robots with a remaining battery level of more than a certain amount.

However, in the assignment process, it is possible that all tasks cannot be assigned at once, such as the number of task groups is greater than the number of robots. In this case, the server 200 can assign the number of tasks that can be assigned preferentially to the robots 100-1, 100-2, 100-3, and 100-4, and then when at least one robot completes all given tasks (after loading all loading boxes, delivery objects are unloaded in the packing region), and for the robot that has completed all given tasks, at least one task that has not yet been assigned can be assigned. When the assignment is performed, the server 200 may transmit identification information on the robot to which the task is assigned to the worker terminal (for example, 300-1) of the worker designated in the region related to each task. For example, the server 200 may transmit the identification number of the robot to the worker terminal, and the identification number may be displayed on a surface of the robot or output on the display of the robot. In this case, the worker can easily find the robot that the worker himself will load.

In addition, the server 200 may provide the location information of the robot related to the work of the worker to the worker terminal in real time. In this case, the worker may adjust work intensity while anticipating the arrival time of each robot, and by identifying the robot that has arrived first, it is easy to figure out in which region the next task will be carried out.

In addition, the server 200 may transmit information of tasks related to each worker to the worker terminal, and the worker may identify the remaining amount of work in real time. Meanwhile, the server 200 may support sharing of location information for robots assigned tasks related to the same worker among a plurality of robots.

For example, a case is assumed in which a first task for picking a first delivery object is assigned to the robot 100-1, a second task for picking a second delivery object is assigned to the robot 100-2, and the same worker is desig-nated for the first region where the first delivery object is stored and the second region where the second delivery object is stored.

In this case, the server 200 may receive the location information of each robot from each of the robots 100-1 and 100-2, and transmit the location information of the robot 100-1 to the robot 100-2 and transmit the location information of the robot 100-2 to the robot 100-1.

As a result, one embodiment in which the loaded robot 100-1 notifies the arrival of another robot 100-2 is possible, as in the embodiment of FIGS. 4a to 4b described above. In addition, as a result of preemptively sharing a location, it is possible to prevent a situation in which robots adjacent to each other are blocked by each other on a specific path.

In addition, the server 200 may identify the task progress rate based on the progress state of the entire task, and transmit information on the identified task progress rate to at least one worker terminal, a supervisor terminal, and the like.

In addition, the server 200 may calculate, for each region, the average required time of the task related to the delivery object of the corresponding region. In this case, information on the region in which the average required time is equal to or greater than the threshold time may be transmitted to a worker terminal, a supervisor terminal, and the like. As a result, regions in which work is relatively delayed are identified, and the designation (for example, additional designation, replacement) of workers for each region is performed again, or regions where deadlocks occur frequently in the passage of robots and workers may be identified and used to adjust the regions and passages.

Moreover, for each worker, the server 200 may calculate an average required time of a task related to the worker and transmit the average required time to at least one worker terminal or a supervisor terminal. That is, the server 200 may calculate and share the average required time of the tasks for all of one or more regions designated for each worker.

In addition, according to one embodiment, the server 200 may display monitoring information for the plurality of tasks through at least one display device. Here, the display device may correspond to a device arranged on the work space of workers and including a display panel. For example, the display device may correspond to various devices such as an electric billboard, a screen, a wall display, or the like, and may be installed in at least one region in which various items that may be delivery objects are stored or in the movement passage of workers, but limited thereto.

The monitoring information may include the number of processed tasks, the number of unprocessed tasks, the location of the robot to which the task is assigned, the location of the robot to which the task is not assigned, the loading progress rate of the delivery object included in the task assigned to each robot, or the like.

Meanwhile, the various embodiments described above may be implemented by combining two or more embodiments as long as they do not conflict with or contradict each other.

Meanwhile, the various embodiments described above may be implemented in a recording medium readable by a computer or a similar device using software, hardware, or a combination thereof.

According to the hardware implementation, the embodiments described in the present disclosure may be implemented using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

In some cases, the embodiments described herein may be implemented by the processor itself. According to the software implementation, embodiments such as the procedures and functions described in this specification may be implemented as separate software modules. Each of the above-described software modules may perform one or more functions and operations described herein.

Meanwhile, a computer instruction or computer program for performing processing operations in electronic devices such as robots and servers according to various embodiments of the present disclosure described above may be stored in a non-transitory computer-readable medium. When the computer instruction or computer program stored in the non-transitory computer-readable medium is executed by the processor of the specific device, the specific device performs the processing operation in the electronic device according to the various embodiments described above.

The non-transitory computer-readable medium refers to a medium that stores data semi-permanently, rather than a medium that stores data for a short moment, such as a register, cache, memory, or the like, and can be read by a device. Specific examples of the non-transitory computer-readable medium may include a CD, DVD, hard disk, Blu-ray disk, USB, memory card, ROM, and the like.

In the above, preferred embodiments of the present disclosure have been illustrated and described, but the present disclosure is not limited to the specific embodiments described above, various modifications may be made by those skilled in the art without departing from the gist of the present disclosure as claimed in claims, and these modifications should not be understood separately from the spirit or prospect of the present disclosure.

The invention claimed is:

1. A task performance method of a system configured to perform a task on a delivery object using a plurality of robots assisting a worker, the task including information on a location where one or more delivery objects are stored, the system including a server and the plurality of robots, the task performance method comprising:

assigning, by the server, at least one task of a plurality of tasks stored in advance to a first robot among the plurality of robots;

determining, by the server, a path for arranging the first robot to a first location in which at least one delivery object related to the task assigned to the first robot is stored;

guiding, by the server, the first robot to the first location according to a determined path;

guiding, by the server, the first robot arranged in a first position to a second position;

moving the first robot to a second location when weight of a delivery object loaded on the first robot exceeds a reference weight or a load equal to or larger than a reference value is applied to a predetermined area by the delivery object loaded on the first robot; and if a loading operation at the first location where at least one shipment related to a first task assigned to the first robot is stored is not completed and the second location is selected based on a user input entered through the first robot, assigning, by the server, the first task that was interrupted at the first location to a second robot corresponding to at least one of a robot closest to the first location, a robot that can first move to the first location after completing an ongoing task, and a robot that most recently performed shipment unloading at a station where shipments are unloaded.

2. The task performance method of claim 1, further comprising displaying, by the first robot, information on a loading box of the first robot in which the delivery object related to an assigned task should be loaded through a display of the first robot.

3. The task performance method of claim 1, further comprising confirming, by the first robot, loading of the delivery object to a loading box of the first robot.

4. The task performance method of claim 1, further comprising scanning, by the first robot, an identification mark attached to the delivery object through a scanner of the first robot.

5. The task performance method of claim 4, further comprising assigning, by the server, a new task to the first robot when a scanning of the identification marks of all delivery objects included in an assigned task is completed.

6. The task performance method of claim 1, further comprising:

receiving, by the first robot, a user input selecting at least one of a location where a deliver object included in a new task is stored, a location of a station where the delivery object loaded in the first robot is unloaded, and a location of a station where a robot is charged as the second location, through a display of the first robot; and determining, by the server, a path for arranging the first robot to the second location.

7. The task performance method of claim 1, further comprising guiding, by the server, the first robot to a packing station for packing the delivery object loaded on the first robot.

8. The task performance method of claim 7, further comprising moving the first robot to a packing region matching classification criteria of the delivery object loaded on the first robot among a plurality of packing regions constituting the packing station.

9. The task performance method of claim 1, further comprising displaying, by the server, monitoring information on the plurality of tasks through at least one display device, wherein the monitoring information includes at least one of the numbers of processed tasks, the number of unprocessed tasks, a location of the first robot to which the task is assigned, a location of a third robot to which the task is not assigned, and a loading progress rate of the delivery object included in the task assigned to the first robot.

10. The task performance method of claim 1, wherein the guiding of the first robot to the second location includes guiding, by the server, the first robot to the second location corresponding to a standby location when a work end time has arrived.

11. The task performance method of claim 1, wherein the guiding of the first robot to the second location includes guiding, by the server, the first robot to the second location corresponding to an evacuation location closest to a current position of the first robot when a preset emergency situation occurs.

12. A non-transitory computer-readable medium storing computer-readable at least one instruction that is executed by a processor of an electronic apparatus, when executed by the processor, the instruction cause the electronic apparatus perform an operation comprising:

assigning at least one task of a plurality of tasks stored in advance to a first robot among the plurality of robots;

determining a path for arranging the first robot to a first location in which at least one delivery object related to the task assigned to the first robot is stored;

guiding the first robot to the first location according to a determined path;

guiding the first robot arranged in a first position to a second position;

moving the first robot to a second location when weight of a delivery object loaded on the first robot exceeds a reference weight or a load equal to or larger than a reference value is applied to a predetermined area by the delivery object loaded on the first robot; and if a loading operation at the first location where at least one shipment related to a first task assigned to the first robot is stored is not completed and the second location is selected based on a user input entered through the first robot, assigning, by a server, the first task that was interrupted at the first location to a second robot corresponding to at least one of a robot closest to the first location, a robot that can first move to the first location after completing an ongoing task, and a robot that most recently performed shipment unloading at a station where shipments are unloaded.

\* \* \* \* \*